UNITED STATES PATENT OFFICE.

JOHN T. FRANCIS, OF OKANOGAN, WASHINGTON.

SAW-SETTING APPARATUS.

1,377,826. Specification of Letters Patent. Patented May 10, 1921.

Application filed March 5, 1920. Serial No. 363,497.

*To all whom it may concern:*

Be it known that I, JOHN T. FRANCIS, a citizen of the United States of America, and resident of the city of Okanogan, Okanogan county, State of Washington, have invented certain new and useful Improvements in Saw-Setting Apparatus, of which the following is a specification.

My invention comprises an improvement in saw sets, particularly in saw setting apparatus which may be used to set hand saws, and known as hand saw sets.

The object of my invention is to provide a saw set of the character described which is sufficiently powerful to set a saw tooth and which will not be so easily worn out as the saw sets now in use.

Another object of my invention is to provide a saw set by means of which the user's efforts are more directly and efficiently applied to setting the saw tooth.

A further object is the provision of a saw set which will function perfectly although the parts may have been considerably worn, and a saw set which provides for the wearing of certain working parts.

My invention comprises the novel parts and combinations thereof which are shown in the accompanying drawings, described in the specification, and defined by the claims terminating the same.

In the accompanying drawings I have shown my invention in the form which is now preferred by me.

Figure 1 is a vertical axial section through my saw set.

Fig. 2 is a plan view of my saw set.

Fig. 3 is a transverse section through a portion of my saw set, illustrating the anvil employed.

Fig. 4 is a perspective of the anvil block.

Upon the outer jaw 10 of the frame 1 of my invention I mount an anvil block 2. This anvil block is adjustable in the jaw 10 and is secured in any fixed position by means of the set screw 20. This anvil 2 is beveled in a manner to be described later. Coöperating with the anvil is a plunger 3 which is mounted for reciprocation toward and from the anvil in the guides 11 of the frame. Preferably the plunger 3 is round in cross-section and has its end 32 milled off on both sides to form a more or less rectangular point which is beveled to correspond to the bevel of the anvil block 2, as will be later described. I may also provide means for returning or retracting the plunger 3 after it has been projected by means to be later described. The retracting means shown herein consists of the spring 31 bearing upon the frame and upon a collar 34 which is held in place upon the plunger by means of a pin 33 passing therethrough.

In order to prevent rotation of the plunger upon its axis the pin 33 may be extended at its lower end to engage in a groove 12 in the frame. At its inner end the plunger 3 is engaged by an end 40 of a screw 4. The screw is formed with relatively high pitched threads engaging complemental threads in the frame. In my preferred form I have shown the screw 4 as having double square threads of a pitch of approximately one inch. By this high pitch a quarter turn of the screw 4 will project the screw 4 and the plunger 3 with which it connects a quarter of an inch. The screw may be turned in any suitable manner, as by a knurled hand wheel 41 secured upon a square end 42 of the screw.

I may provide also a guide block 5 which is secured to the under side of the frame 1. This guide block 5 may be adjustable in and out upon the frame by means of the set screw 50 passing through the slot 51 in the guide block and screwing into the frame. Similar devices are common in saw sets.

The anvil 2, as has been stated, is adjustable in the jaw 10, by being slidable transversely thereof. Its setting edge 21 is preferably placed at an angle to the direction of motion of the saw in moving through the frame, although the beveled surfaces 22 and 23 are formed as plane surfaces. By this construction it is possible, by sliding the block transversely in the frame to provide a longer or shorter set to the saw; that is, the tooth may be set closer to or farther from its point, depending upon the position of the anvil, and consequently the line of engagement of the setting edge 21 with the tooth to be set. This may be seen from an inspection of Fig. 3. By reversing the anvil from the position shown in Fig. 3 end for end a longer set may be obtained if this is desired, although generally such a long set would not be found desirable.

The angle of the set may be determined by the position of the guide block 5. By projecting this toward the jaw 10 the angle of the saw with the upper beveled surface 22 of the anvil is increased, and hence the I. GARELA.
SCREW PROPELLER.
APPLICATION FILED OCT. 11, 1920.
1,377,827.
Patented May 10, 1921.
2 SHEETS—SHEET 1.
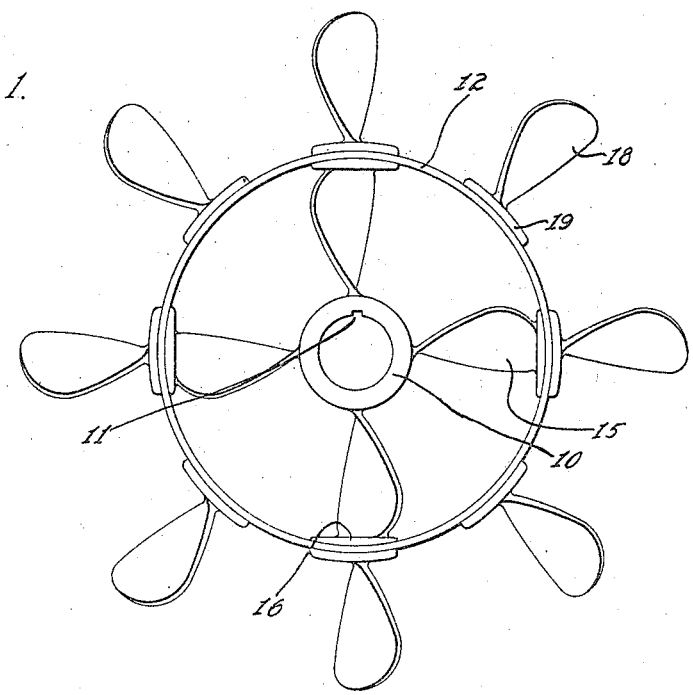
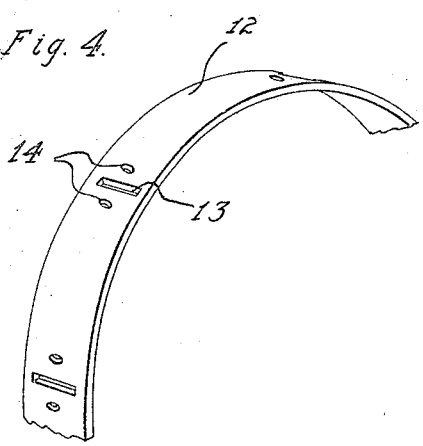
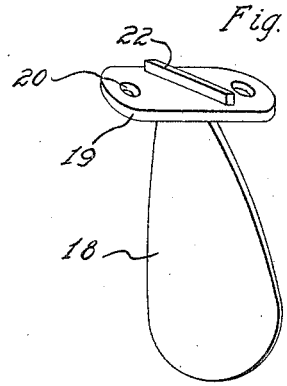
I. Garela.
INVENTOR
BY *Victor J. Evans*
ATTORNEY